(12) United States Patent
Matsunaga (10) Patent No.: US 8,169,927 B2
(45) Date of Patent: May 1, 2012

(54) CONFIGURATION MANAGEMENT METHOD AND CONFIGURATION MANAGEMENT SYSTEM OF WIRELESS ACCESS NETWORK, AND WIRELESS ACCESS NETWORK MANAGEMENT DEVICE

(75) Inventor: Yasuhiko Matsunaga, Tokyo (JP)

(73) Assignee: NEC Corporation, Tokyo (JP)

( * ) Notice: Subject to any disclaimer, the term of this patent is extended or adjusted under 35 U.S.C. 154(b) by 681 days.

(21) Appl. No.: 12/302,147

(22) PCT Filed: May 29, 2007

(86) PCT No.: PCT/JP2007/060890
§ 371 (c)(1),
(2), (4) Date: Nov. 24, 2008

(87) PCT Pub. No.: WO2007/142076
PCT Pub. Date: Dec. 13, 2007

(65) Prior Publication Data
US 2009/0270106 A1    Oct. 29, 2009

(30) Foreign Application Priority Data
May 29, 2006  (JP) ................................ 2006-148821

(51) Int. Cl.
*H04L 12/26* (2006.01)
(52) U.S. Cl. ...................................................... 370/252
(58) Field of Classification Search .................. 370/241, 370/252, 254, 255, 431, 437, 310, 328, 329, 370/331–332, 338, 341, 464, 465, 468; 455/3.01, 455/3.03, 3.04, 403, 422.1–425, 435.1, 435.2, 455/436, 445, 456.1, 450–453, 455, 39, 500, 455/507, 509, 513, 515–517, 524, 525, 91, 455/95, 103, 115.1, 115.3, 115.4, 130, 132, 455/226.1–226.2, 226.4
See application file for complete search history.

(56) References Cited

U.S. PATENT DOCUMENTS 5,727,051 A * 3/1998 Holender ................. 379/112.05
5,963,919 A * 10/1999 Brinkley et al. ................. 705/28
(Continued)

FOREIGN PATENT DOCUMENTS
JP    1995046641 A    2/1995
(Continued)

OTHER PUBLICATIONS

International Search Report for PCT/JP2007/060890 mailed Sep. 11, 2007.
(Continued)

*Primary Examiner* — Derrick Ferris
*Assistant Examiner* — Omar Ghowrwal (57) ABSTRACT

A configuration of a wireless cell contained by a wireless network control station in a wireless access network is optimized to efficiently achieve leveling of a processing load in the wireless network control station. A wireless access network management device inputs input information including position information of a wireless cell, traffic demand of each wireless cell, location registration demand of each wireless cell, handover demand with respect to each adjacent wireless cells of each wireless cell, and internal processing time required by a wireless network control station for traffic processing, location registration processing, and handover processing. Then, a wireless cell group to be controlled by a wireless network control station is selected based on the input information so that processing loads of a plurality of wireless network control station are leveled.

8 Claims, 10 Drawing Sheets

300: COMMUNICATION QUALITY STATISTICAL INFORMATION

| STATISTIC ITEMS \ WIRELESS CELL | WIRELESS CELL 80 | WIRELESS CELL 81 | WIRELESS CELL 82 | ... |
|---|---|---|---|---|
| 301 NUMBER OF CIRCUIT-SWITCHED OUTGOING AND INCOMING CALL | 60 | 2 | 0 | ... |
| 302 NUMBER OF PACKET-SWITCHED OUTGOING AND INCOMING CALL | 2 | 0 | 0 | ... |
| 303 NUMBER OF TIMES OF LOCATION REGISTRATION | 57 | 2 | 0 | ... |
| 304 NUMBER OF TIMES OF HANDOVER | 80→81:0.50 80→82:1 | 81→82:30 81→80:40 | 82→81:40 82→80:2 | ... |
| ... | ... | ... | ... | ... |

(Periods: PERIOD T1–T2, PERIOD T2–T3, PERIOD T3–T4)

U.S. PATENT DOCUMENTS

| | | | |
|---|---|---|---|
| 2003/0202468 A1* | 10/2003 | Cain et al. | 370/229 |
| 2004/0043774 A1* | 3/2004 | Lee | 455/456.1 |
| 2007/0099561 A1* | 5/2007 | Voss | 455/12.1 |
| 2009/0042572 A1* | 2/2009 | Craig et al. | 455/436 |

FOREIGN PATENT DOCUMENTS

| | | |
|---|---|---|
| JP | 1996084364 A | 3/1996 |
| JP | 1996340380 A | 12/1996 |
| JP | 2003174665 A | 6/2003 |
| JP | 2003199136 A | 7/2003 |
| JP | 2005072682 A | 3/2005 |
| WO | 0235871 A2 | 5/2002 |

OTHER PUBLICATIONS

Sami Tabbane, "Modelling the MSC/VLR Processing Load Due to Mobility Management", IEEE International Conference on Universal Personal Communications (ICUPC), Oct. 1998, vol. 1, pp. 741-744.

* cited by examiner

300: COMMUNICATION QUALITY STATISTICAL INFORMATION

PERIOD T3-T4

PERIOD T2-T3

PERIOD T1-T2

| STATISTIC ITEMS \ WIRELESS CELL | WIRELESS CELL 80 | WIRELESS CELL 81 | WIRELESS CELL 82 | ... |
|---|---|---|---|---|
| 301 NUMBER OF CIRCUIT-SWITCHED OUTGOING AND INCOMING CALL | 60 | 2 | 0 | ... |
| 302 NUMBER OF PACKET-SWITCHED OUTGOING AND INCOMING CALL | 2 | 0 | 0 | ... |
| 303 NUMBER OF TIMES OF LOCATION REGISTRATION | 57 | 2 | 0 | ... |
| 304 NUMBER OF TIMES OF HANDOVER | 80→81:0.50<br>80→82:1 | 81→82:30<br>81→80:40 | 82→81:40<br>82→80:2 | ... |
| ... | ... | ... | ... | ... |
| ... | ... | ... | ... | ... |

401: WIRELESS NETWORK CONTROL STATION INFORMATION

| | WIRELESS NETWORK CONTROL STATION 50 | WIRELESS NETWORK CONTROL STATION 51 | ... |
|---|---|---|---|
| 450 CIRCUIT-SWITCHED OUTGOING AND INCOMING CALL PROCESSING TIME | X μsec | ... | ... |
| 451 PACKET-SWITCHED OUTGOING AND INCOMING CALL PROCESSING TIME | Y μsec | ... | ... |
| 452 LOCATION REGISTRATION PROCESSING TIME | Z μsec | ... | ... |
| 453 PROCESSING TIME OF HANDOVER IN WIRELESS NETWORK CONTROL STATION | U μsec | ... | ... |
| 454 PROCESSING TIME OF HANDOVER BETWEEN WIRELESS NETWORK CONTROL STATIONS | V μsec | ... | ... |
| ... | | | |

FIG.6

402: WIRELESS BASE STATION INFORMATION

| | WIRELESS NETWORK CONTROL STATION ID (463) | WIRELESS BASE STATION ID (464) | WIRELESS BASE STATION LATITUDE (465) | WIRELESS BASE STATION LONGITUDE (466) | ... |
|---|---|---|---|---|---|
| WIRELESS BASE STATION 30 (460) | 50 | 30 | Nxx.yyyyyy | Exx.yyyyyy | ... |
| WIRELESS BASE STATION 31 (461) | 50 | 31 | Nxx.yyyyyy | Exx.yyyyyy | ... |
| WIRELESS BASE STATION 32 (462) | 51 | 32 | Nxx.yyyyyy | Exx.yyyyyy | ... |
| ... | | | | | |

FIG.7

403: WIRELESS CELL INFORMATION

| | WIRELESS NETWORK CONTROL STATION ID (474) | WIRELESS BASE STATION ID (475) | WIRELESS CELL ID (476) | TRAFFIC DEMAND ESTIMATION VALUE (477) | LOCATION REGISTRATION DEMAND ESTIMATION VALUE (478) | HANDOVER DEMAND ESTIMATION VALUE (479) | ... |
|---|---|---|---|---|---|---|---|
| WIRELESS CELL 80 | 50 | 30 | 80 | 0.9 | 0.1 | 80→81:0.50<br>80→82:0.01 | ... |
| WIRELESS CELL 81 | 50 | 31 | 81 | 0.8 | 0.3 | 81→82:0.330<br>81→80:0.40 | ... |
| WIRELESS CELL 82 | 51 | 32 | 82 | 0.7 | 0.2 | 82→81:0.40<br>82→80:0.02 | ... |
| ... | ... | ... | ... | ... | ... | | |

CONFIGURATION MANAGEMENT METHOD AND CONFIGURATION MANAGEMENT SYSTEM OF WIRELESS ACCESS NETWORK, AND WIRELESS ACCESS NETWORK MANAGEMENT DEVICE

INCORPORATION BY REFERENCE

This application is the National Phase of PCT/JP2007/060890, filed May 29, 2007, which claims priority to Japanese Patent Application No. 2006-148821, filed on May 29, 2006, the disclosure of which is incorporated herein in its entirety by reference.

TECHNICAL FIELD

The present invention relates to a configuration management in a mobile communication network, and in particular, to a configuration management method and a configuration management system of a wireless access network and a wireless access network management device that can attempt leveling of a processing load in a wireless network control station that controls a wireless access network.

BACKGROUND ART

In a mobile communication network, wireless base stations are provided at spacing of around several hundred meters to several kilometers. Each of the wireless base stations establishes communication with a mobile terminal positioned in a narrow range called a wireless cell. In this manner, a service area that is wide two-dimensionally is achieved. The wireless cells have a variety of sizes and shapes, which are determined in overall consideration of a radio wave propagation characteristic, population in an area, a moving characteristic of the user, and the like.

In general, a wireless network control station is allocated to a group of several tens to several hundreds of wireless cells. The wireless network control station carries out transfer of user data with a core network, processing of outgoing and incoming calls with respect to a mobile terminal, processing of handover when a mobile terminal moves between wireless cells, transfer processing of a location registration message when a mobile terminal moves between location registration areas, and the like.

In order to efficiently operate the wireless network control station, a plurality of wireless cells to be contained are preferably selected in a manner that there is no significant bias generated in processing loads of a plurality of wireless network control stations. Hereinafter, a group of a plurality of wireless cells contained in the wireless network control station may be called a wireless cell group. In addition, in general, a processing load of handover between wireless cells belonging to different wireless network control stations tends to increase with respect to a processing load of handover between wireless cells belonging to the same wireless network control station. In order to prevent increase in a processing load of the wireless network control station, a plurality of wireless cells to be contained in one wireless network control station are desirably selected from wireless cells close to each other geographically.

Further, a configuration of a wireless cell group to be contained in a wireless network control station should be reviewed from every month to every year or so depending on environmental change of a radio wave propagation characteristic, change in demand, change in a moving characteristic of the user, and the like.

As a configuration management system of a wireless access network that achieves leveling of a processing load of the wireless network control station, there is a method of achieving dynamic load distribution in a manner that a load of the wireless network control station is monitored from an exchange of a core network during operation, and when the load exceeds a threshold value, calling processing is transferred to other wireless network control stations (for example, refer to Patent Document 1).

In addition, there suggested is a method of achieving leveling of a processing load of the wireless network control station in a manner that, in a wireless access network including a wireless network control device, a hub, and a wireless base station which are connected hierarchically, optimization of a hub level with the wireless base station as a unit and optimization of a wireless network control station unit with a hub as a unit are carried out repeatedly based on traffic demand of each wireless cell (for example, refer to Patent Document 2) In addition, there suggested is a method of changing a wireless cell configuration based on a measured traffic amount in order to level traffic in a wireless access network (for example, refer to Patent Document 3).

Patent Document 1: JP 2003-199136-A
Patent Document 2: Pamphlet of WO 02/35871
Patent Document 3: JP 2003-174665-A

DISCLOSURE OF THE INVENTION

Problems to be Solved by the Invention

In a load distribution system described in Patent Document 1, the wireless network control station includes a monitoring interface function for allowing other nodes to monitor a processing load. Also, the wireless network control station needs to have a function of achieving dynamic load distribution of a processing load by an instruction of other nodes. Therefore, in case the load distribution system described in Patent Document 1 is achieved, there is a problem with respect to coexistence of a wireless network control station having the above functions, and a conventional wireless network control station that does not have the above functions. In addition, a link between an exchange station of a core network and the wireless network control station are generally connected in a tree form. For this reason, there is a problem that, as a result of transferring a processing load from one wireless network control station to other wireless network control stations, a utilization efficiency of a link connecting the core network and the wireless network control station is temporarily lowered.

In addition, in the methods described in Patent Documents 2 and 3, traffic demand or a measured traffic amount of each wireless cell is used as a reference for leveling of a processing load in the wireless network control station. However, a processing load in a mobile communication network is occupied in the large proportion by a processing load accompanied by moving of a mobile terminal. For example, a document described below shows an example where around 40% of a processing load in a GSM network is caused by moving of a mobile terminal between wireless cells.

[Document] S. Tabbane, "Modelling the MSC/VLR processing load due to mobility management", IEEE International Conference on Universal Personal Communications (ICUPC), Volume 1, pp. 741-744, October 1998

Therefore, in case a wireless cell belonging to a wireless network control station is selected based on mere traffic demand without considering demand of handover and demand of location registration along moving of a terminal, there is possibility that bias is generated in a processing load in the wireless network control station. In addition, as described above, a processing load of handover between wireless cells belonging to different wireless network control stations tends to increase with respect to a processing load of handover between wireless cells belonging to the same wireless network control station. For this reason, when wireless cells between which a terminal moves frequently are contained in different wireless network control stations, a processing load in the wireless network control stations is increased entirely.

Therefore, an object of the present invention is to achieve leveling of a processing load in a wireless network control station efficiently, in a manner that a configuration of a wireless cell contained in a wireless network control station in a wireless access network is optimized by taking into consideration traffic demand and a mobile characteristic of the user between wireless cells.

Means for Solving the Problems

According to the present invention, there is provided a configuration management method of a wireless access network that is a configuration management method of a wireless access network in a mobile communication system, and includes an inputting step and a selecting step. The inputting step is for inputting input information including position information of a wireless cell, traffic demand of each wireless cell, location registration demand of each wireless cell, handover demand with respect to each adjacent wireless cells of each wireless cell, and internal processing time required by a wireless network control station for traffic processing, location registration processing, and handover processing. the selecting step is for selecting a plurality of wireless cells (hereinafter, a group composed of the selected plurality of wireless cells may be referred to as a wireless cell group) to be controlled by a wireless network control station so that processing loads of a plurality of wireless network control stations are leveled, based on the input information.

According to the present invention, there is provided a configuration management system of a wireless access network that is a configuration management system of a wireless access network in a mobile communication system, and includes an inputting means and a selecting means. The inputting means is for inputting input information including position information of a wireless cell, traffic demand of each wireless cell, location registration demand of each wireless cell, handover demand with respect to each adjacent wireless cells of each wireless cell, and internal processing time required by a wireless network control station for traffic processing, location registration processing, and handover processing. The selecting means is for selecting a plurality of wireless cells to be controlled by a wireless network control station so that processing loads of a plurality of wireless network control stations are leveled, based on the input information.

According to the present invention, there is provided a wireless access network management device that includes an inputting means and a selecting means in a wireless access network management device that carries out configuration management of a wireless base station in a mobile communication system. The inputting means is for inputting input information including position information of a wireless cell, traffic demand of each wireless cell, location registration demand of each wireless cell, handover demand with respect to each adjacent wireless cells of each wireless cell, and internal processing time required by a wireless network control station for traffic processing, location registration processing, and handover processing. The selecting means is for selecting a plurality of wireless cells to be controlled by a wireless network control station so that processing loads of a plurality of wireless network control stations are leveled, based on the input information.

Advantages of the Invention

According to the present invention, leveling of a processing load in a wireless network control station can be achieved efficiently by optimizing a configuration of a wireless cell contained in the wireless network control station, in consideration of handover demand of the user that moves from each wireless cell to other adjacent wireless cells, and demand of location registration, in addition to traffic demand of each wireless cell.

EXPLANATION OF REFERENCE SYMBOLS 10 to 14: Mobile terminal
20 to 24: Wireless link
30 to 32: Wireless base station
40 to 47: Wired link
50 and 51: Wireless network control station
60: Core network
70: External network
80 to 82: Wireless cell
90: Wireless access network management device
201: Data transmission and receiving means
202: Failure managing means
203: Quality monitoring means
204: configuration managing means
205: Communication quality statistics storing means
206: Demand estimating means
207: Network configuration storing means
300: Communication quality statistical information
400: Wireless access network configuration information 401: Wireless network control station information
402: Wireless base station information
403: Wireless cell information

BEST MODE FOR CARRYING OUT THE INVENTION

Next, an example of the present invention will be described with reference to the accompanying drawings.

Figure 1:
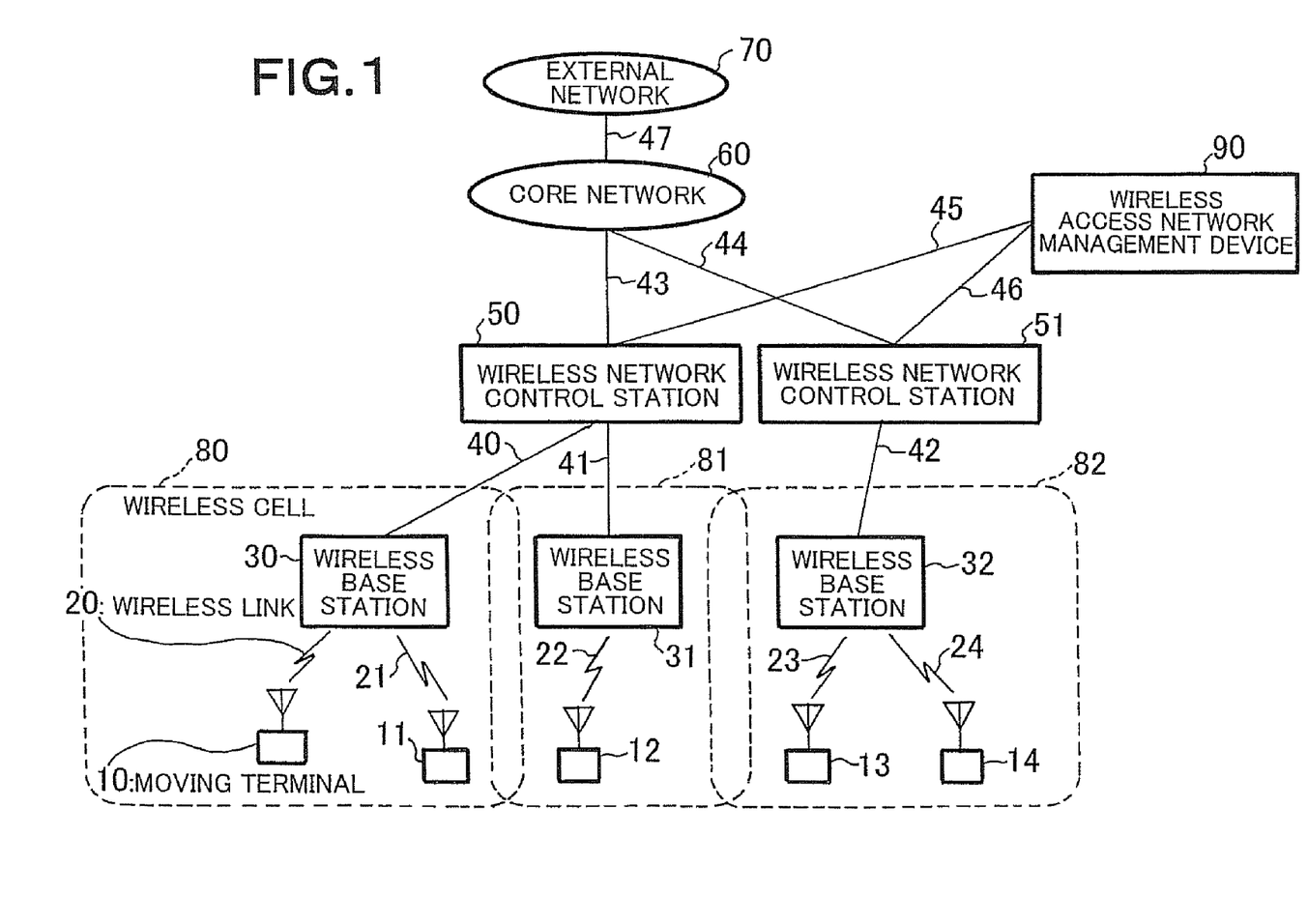
FIG. 1 is a block diagram showing a configuration example of a mobile communication network as an example of the present invention.

FIG. 1 is a block diagram showing a configuration example of a mobile communication network as an example of the present invention. The mobile communication network shown in FIG. 1 uses a configuration management method and a configuration management system of a wireless access network in a mobile communication system, and includes a wireless access network management device that carries out configuration management of a wireless base station in the mobile communication system. In the configuration shown in FIG. 1, a wireless base station 30 is connected to mobile terminals 10 and 11 existing in the inside of a wireless cell 80 through wireless links 20 and 21. A wireless base station 31 is connected to a mobile terminal 12 existing in the inside of a wireless cell 81 through a wireless link 22. A wireless base station 32 is connected to mobile terminals 13 and 14 existing in the inside of a wireless cell 82 through wireless links 23 and 24.

A wireless network control station 50 is connected to wireless base stations 30 and 31 through wired links 40 and 41, and contains wireless cells 80 and 81. A wireless network control station 51 is connected to a wireless base station 32 through a wired link 42, and contains a wireless cell 82. In the present example, one wireless cell that corresponds to a wireless base station is shown. However, in general, three to six and so on of wireless cells are contained in each wireless base station. In addition, the wireless network control stations 50 and 51 acquire monitoring information from wireless cells contained thereunder, and notify a monitoring result based on the monitoring information to a wireless access network management device 90 through wired links 45 and 46. The wireless access network management device 90 changes configuration management and carries out failure recovery operation with respect to the wireless network control stations 50 and 51 and the wireless base stations 30, 31, and 32.

Traffic of the user is transferred between the wireless network control devices 50 and 51 and a core network 60 through wired links 43 and 44. Further, the traffic is transferred from the core network 60 to an external network 70 through a wired link 47.

Figure 2:
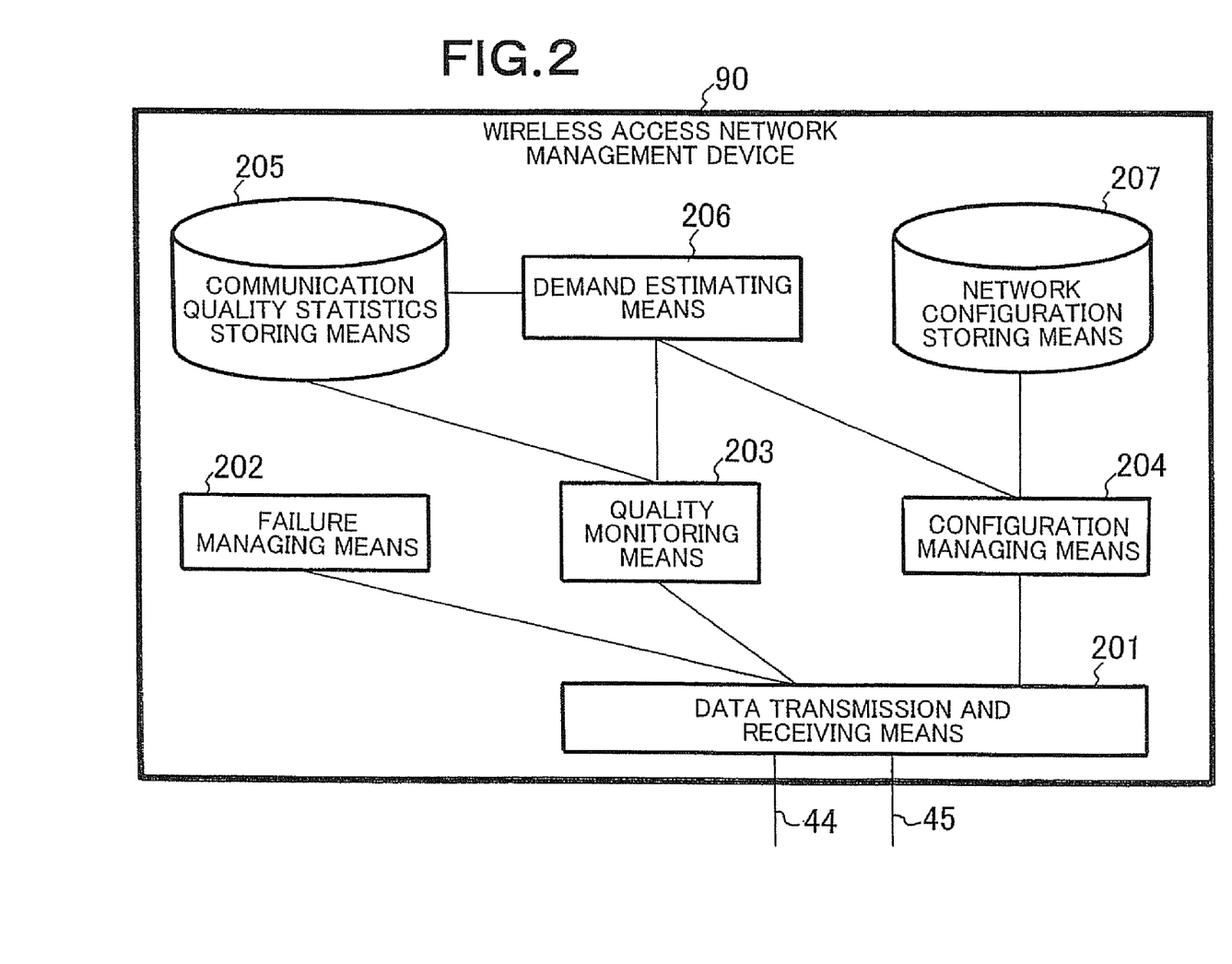
FIG. 2 is a block diagram showing a configuration example of a wireless access network management device.

FIG. 2 is a block diagram showing a configuration example of the wireless access network management device 90. In the wireless access network management device 90, when monitoring information is input from the wireless network control stations 50 and 51 through a data transmission and receiving means 201, a failure managing means 202, a quality managing means 203, or a configuration managing means 204, depending on a type of the monitoring information, carries out processing. In case traffic quality information that is periodically measured in each wireless cell is received, the quality managing means 203 records a result of measurement in a communication quality statistics storing means 205. A demand estimating means 206 estimates demand in a wireless access network based on information such as a traffic amount recorded in the communication quality statistics storing means 205. A network configuration storing means 207 stores information relating to a wireless network control station, a wireless base station, and a wireless cell configuring a wireless access network. The configuration managing means 204 carries out a change processing of a network configuration based on storing information of the demand estimating means 206 and the network configuration storing means 207.

Hardware and software configurations of each of the above-described means 201 to 207 are not limited in particular. Each of the above-described means 201 to 207 may include any of, for example, a circuit or a unit independently for each function, or a circuit or a unit that integrates a plurality of means, as long as each of the functions can be achieved.

Figure 3:
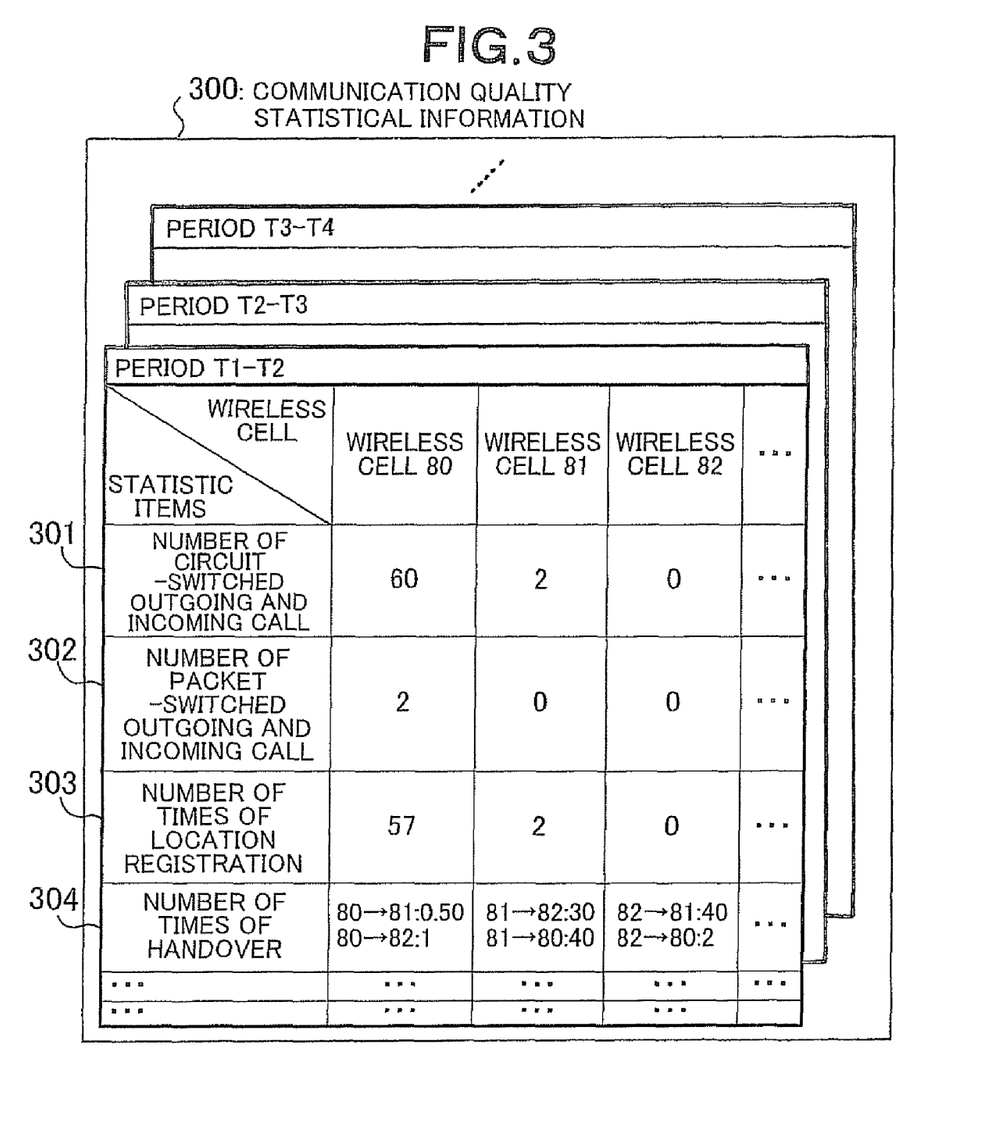
FIG. 3 is an explanatory view showing a configuration example of communication quality statistical information stored in a communication quality statistics storing means.

FIG. 3 is an explanatory view showing a configuration example of communication quality statistical information 300 stored in the communication quality statistics storing means 205. In the example shown in FIG. 3, the communication quality statistics storing means 205 stores a statistical value for each wireless cell and each measurement period as the communication quality statistical information 300. Statistic items include a number 301 of outgoing and incoming circuit-switched calls for each wireless cell, a number 302 of outgoing and incoming packet-switched calls, a number of times 303 of location registration, a number of times 304 of handover of each adjacent wireless cell with respect to a wireless cell, and the like.

Figure 4:
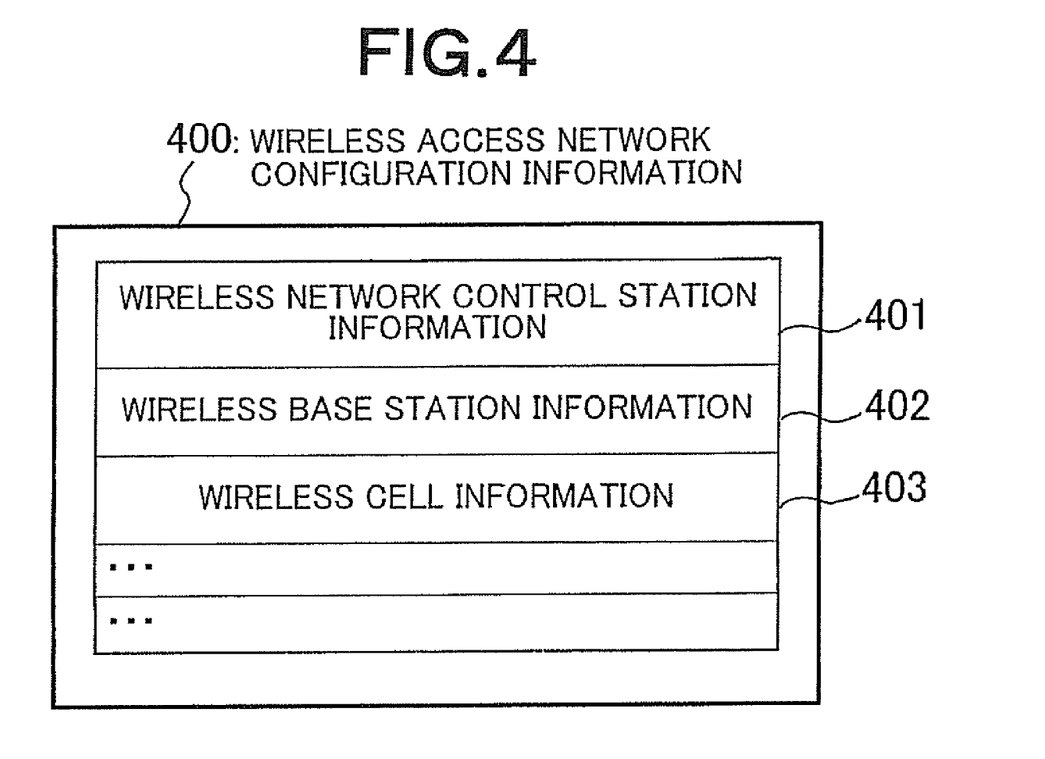
FIG. 4 is an explanatory view showing a configuration example of wireless access network configuration information stored in a network configuration storing means.

FIG. 4 is an explanatory view showing a configuration example of wireless access network configuration information 400 stored in the network configuration storing means 207. In the example shown in FIG. 4, the wireless access network configuration information 400 includes wireless network control station information 401, wireless base station information 402, and wireless cell information 403, and the like.

Figure 5:
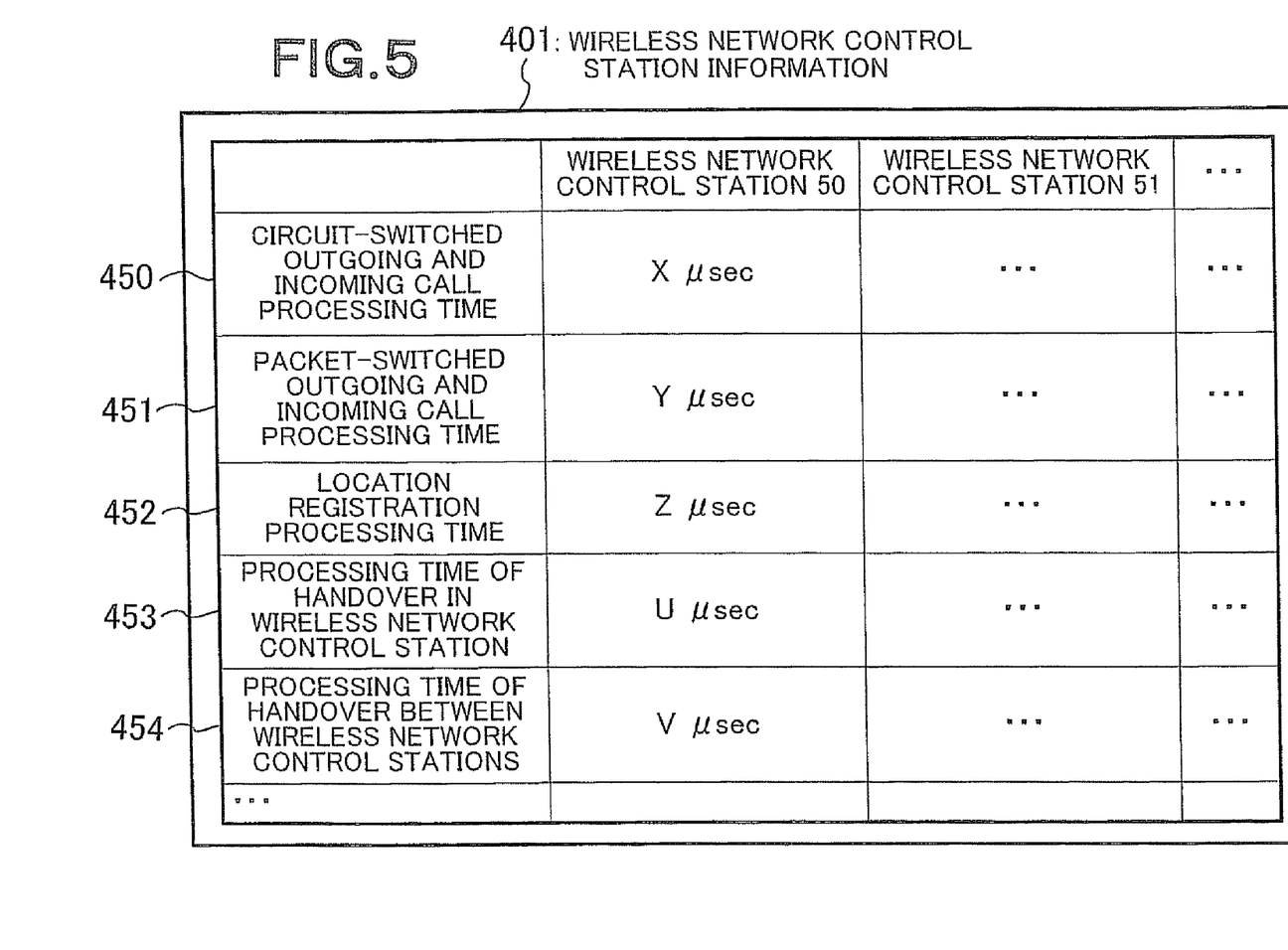
FIG. 5 is an explanatory view showing a configuration example of a wireless network control station information.

FIG. 5 is an explanatory view showing a configuration example of the wireless network control station information 401. The wireless network control station information 401 includes circuit-switched outgoing and incoming call processing time 450 for each wireless network control, packet-switched outgoing and incoming call processing time 451, location registration processing time 452, processing time 453 of handover in a wireless network control station, processing time 454 of handover between wireless network control stations, and the like. The above types of processing time are measured in advance in test operation states of the wireless network control stations 50 and 51, and is stored in the network configuration storing means 207.

Figure 6:
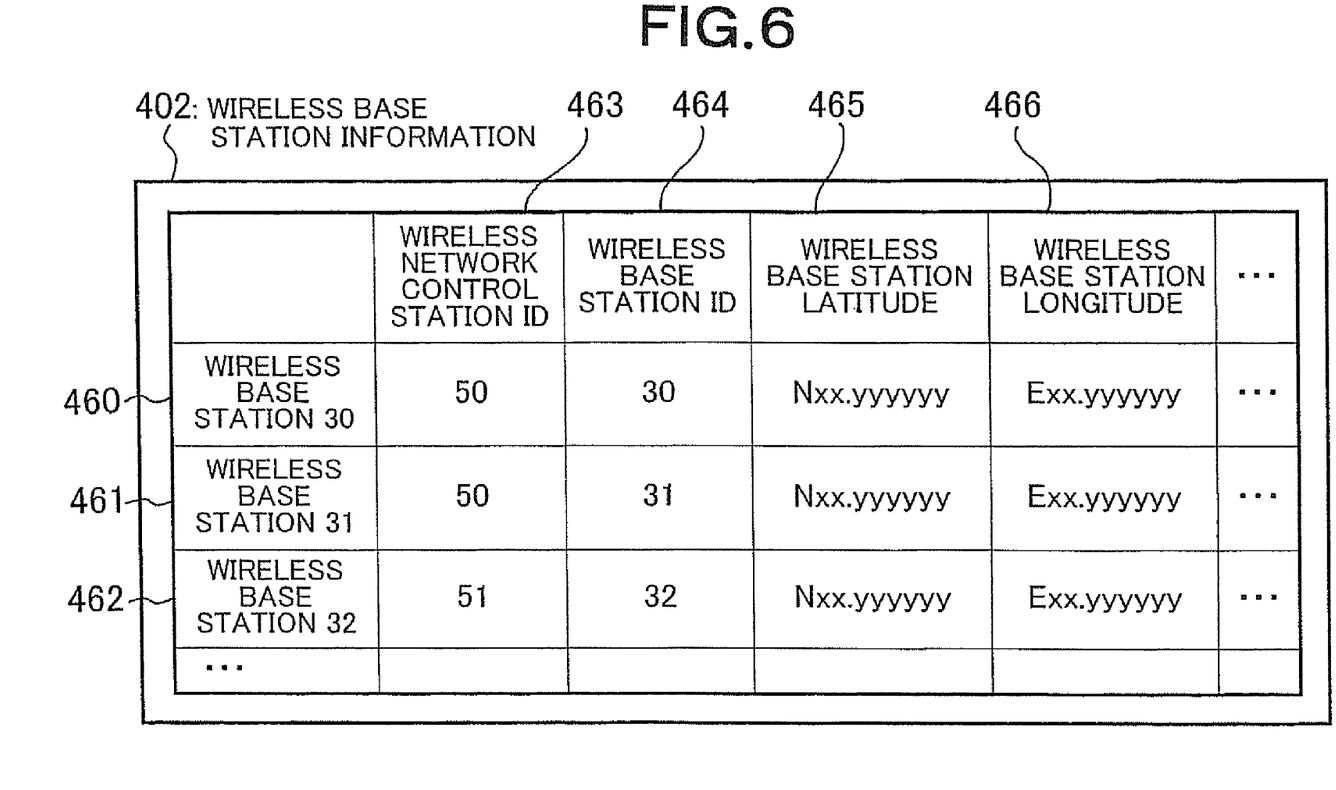
FIG. 6 is an explanatory view showing a configuration example of a wireless network base station information.

FIG. 6 is an explanatory view showing a configuration example of the wireless base station information 402. The wireless base station information 402 includes wireless network control station ID information 463 for each wireless base station, wireless base station ID information 464, latitude information 465 of a wireless base station, longitude information 466 of a wireless base station, and the like. In case a wireless network control station selects a wireless cell to be controlled in a unit of a wireless base station, a position of the wireless base station may be used as a position of the wireless cell.

Figure 7:
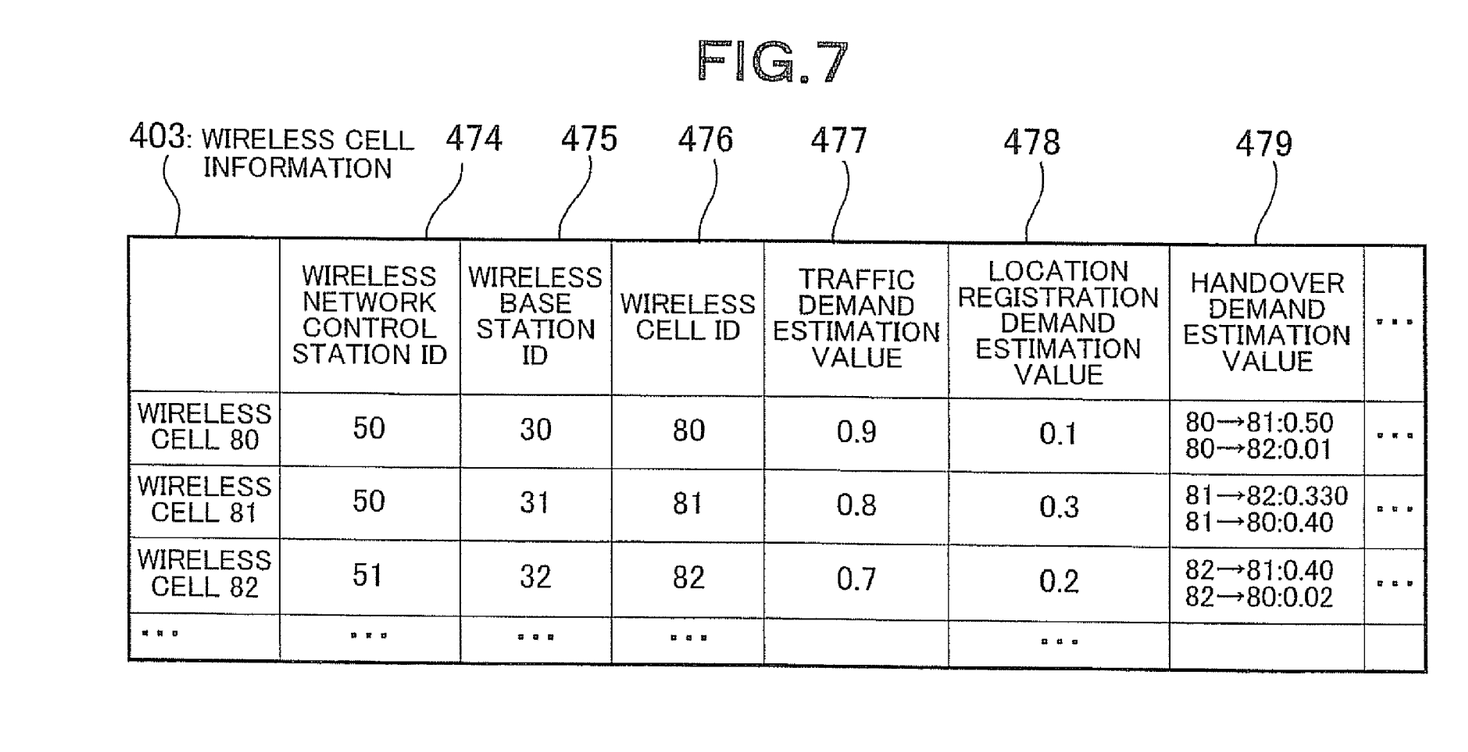
FIG. 7 is an explanatory view showing a configuration example of a wireless cell information.

FIG. 7 is an explanatory view showing a configuration example of the wireless cell information 403. The wireless cell information 403 includes wireless network control station ID information 474 of each wireless cell, wireless base station ID information 475, wireless cell ID information 476, a traffic demand estimation value 477, a location registration demand estimation value 478, a handover demand estimation value 479 and the like.

Configurations of the mobile terminals 10 to 14, the wireless base stations 30 to 32, and the wireless network control devices 50 to 51 shown in FIG. 1 may be similar to configurations of a mobile terminal, a wireless base station, and a wireless network control device which are generally used.

Next, description will be made with respect to operation of the wireless access network management device 90.

The wireless network control stations 50 and 51 acquire monitoring information from wireless cells periodically, and notify a monitoring result based on the monitoring information to the wireless access network management device 90 through the wired links 45 and 46. The monitoring result includes traffic quality information measured periodically for each wireless cell. The traffic quality information includes the number 301 of outgoing and incoming circuit-switched calls for each wireless cell, the number 302 of outgoing and incoming packet-switched calls, the number of times 303 of location registration, the number of times 304 of handover of each adjacent wireless cell with respect to a wireless cell, and the like as exemplified in FIG. 3, or data by which these pieces of information can be identified.

Figure 8:
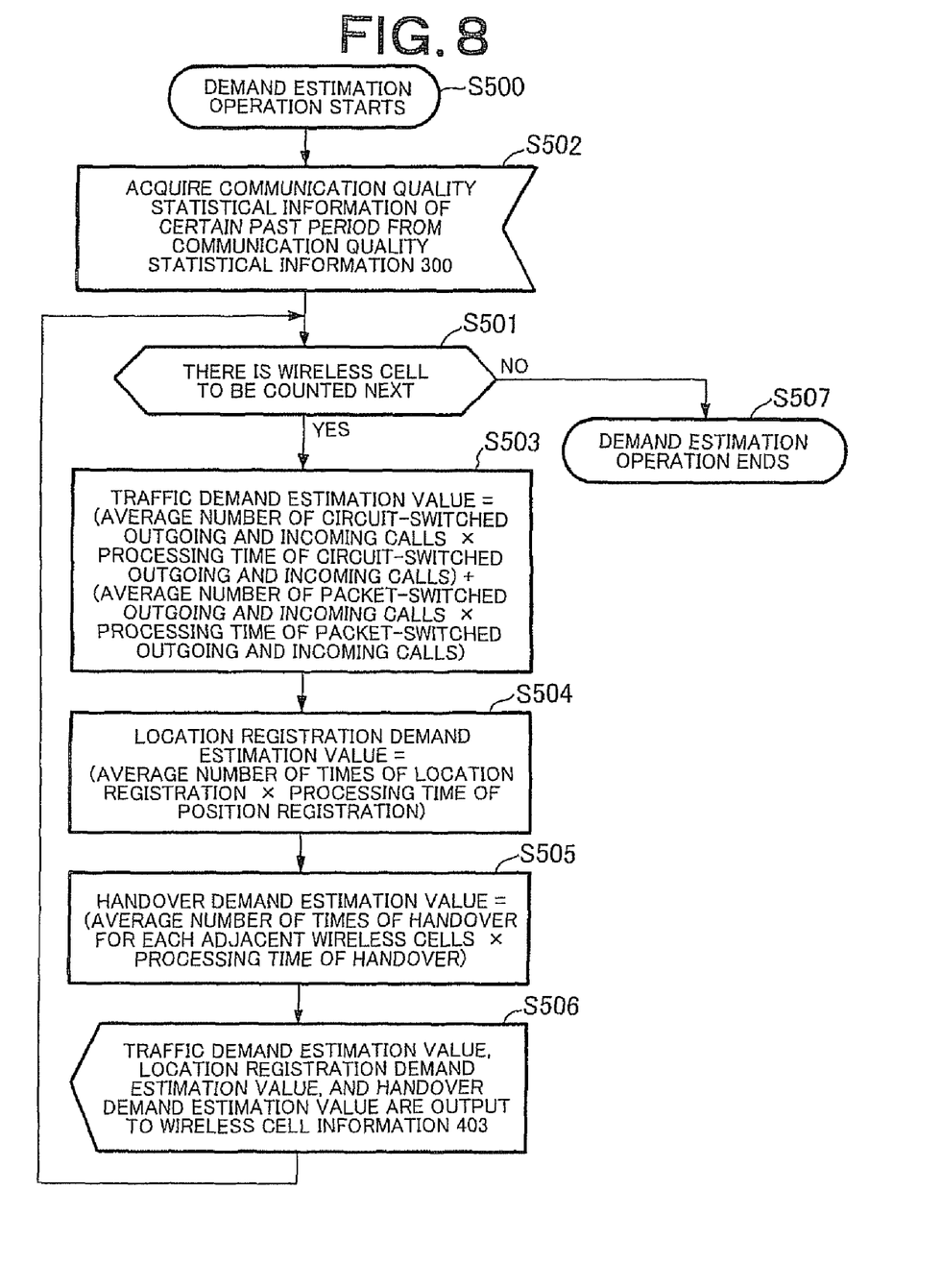
FIG. 8 is a flowchart showing operation of demand estimation operation carried out by a demand estimating means in the wireless access network management device.

FIG. 8 is a flowchart showing operation of demand estimation operation carried out by the demand estimating means 206 in the wireless access network management device 90.

For example, the demand estimating means 206 acquires communication quality statistical information of a certain past period from the communication quality statistical information 300 periodically, or when the communication quality statistical information 300 is updated (Step S501). In addition, the demand estimating means 206 sequentially selects wireless cells in a wireless access network (Step S502), and terminates the demand estimation operation when there is no more wireless cell to be counted (Step S507).

When there is a wireless cell to be counted, the demand estimating means 206 carries out estimation of traffic demand (Step S503), estimation of location registration demand (Step S504), and estimation of handover demand (Step S505) for each of selected wireless cells.

As an example, the demand estimating means 206 sets (average number of circuit-switched outgoing and incoming calls×processing time of circuit-switched outgoing and incoming calls)+(average number of packet-switched outgoing and incoming calls×processing time of packet-switched outgoing and incoming calls) as a traffic demand estimation value. Also, the demand estimating means 206 sets (average number of times of location registration×processing time of location registration) as location registration demand. In addition, the demand estimating means 206 sets (average number of times of handover for each adjacent wireless cells× processing time of handover) as a handover demand estimation value. The word "average" means an average of events (circuit-switched outgoing and incoming calls, packet-switched outgoing and incoming calls, location registration, and handover) that are carried out in a certain past period in wireless cells. With reference to the example shown in FIG. 3, for example, the demand estimating means 206 acquires average time of periods T1 to T4, or average time of a total period stored as the communication quality statistical information 300.

Then, the demand estimating means 206 outputs the estimated traffic demand, location registration demand, and handover demand to the wireless cell information 403 (Step S506), and then carries out processing of a next wireless cell. The wireless cell information 403 is stored in the network configuration storing means 207. Here, when the handover demand is estimated, each of handover to be in a wireless network control station depending on a network configuration and handover between wireless network control stations is identified, and added.

Figure 9:
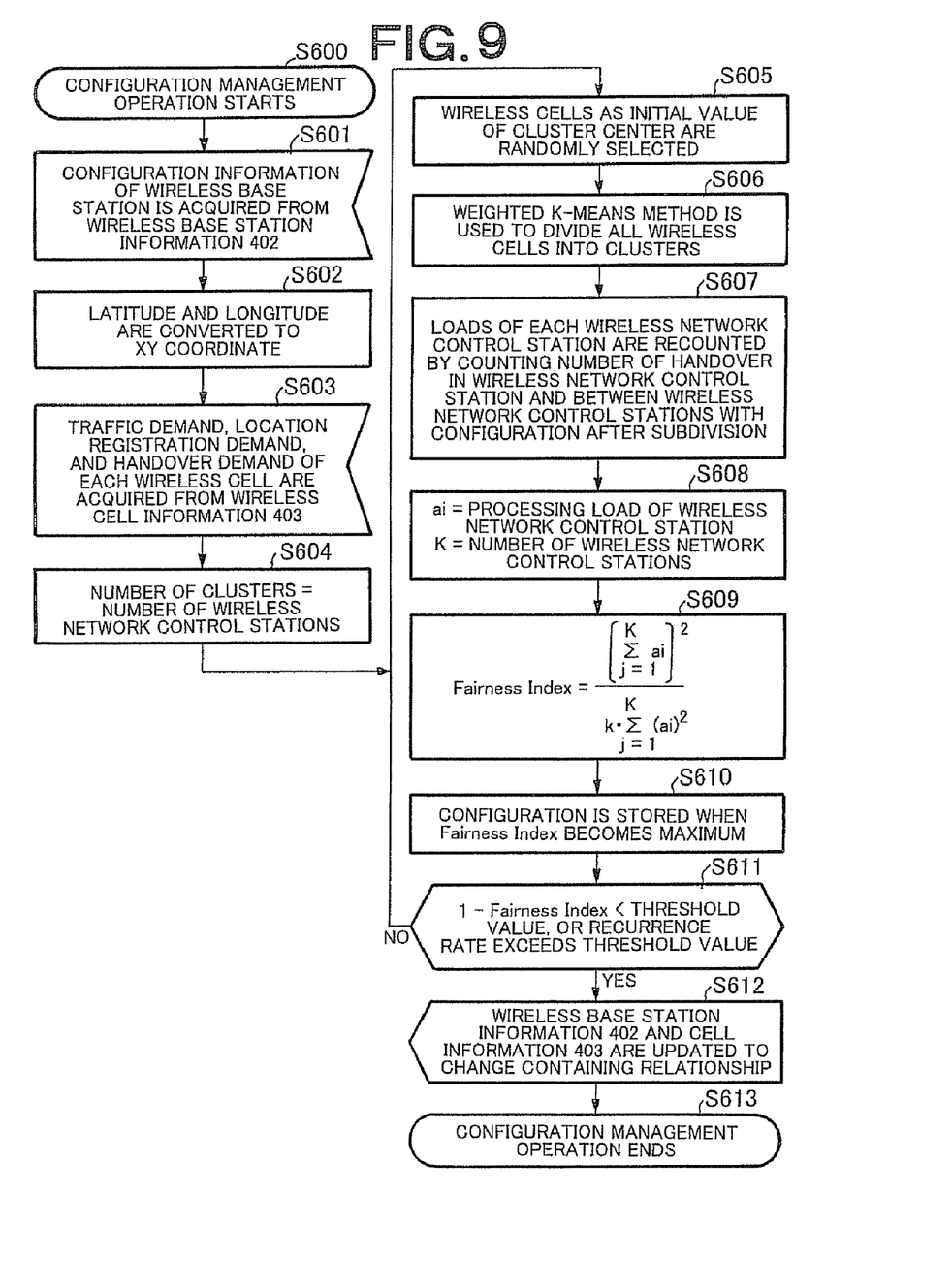
FIG. 9 is a flowchart showing operation of configuration management operation carried out by a configuration managing means in the wireless access network management device.

FIG. 9 is a flowchart showing operation of configuration management operation carried out by the configuration managing means 204 in the wireless access network management device 90. The configuration managing means 204 acquires configuration information of a wireless base station from the wireless base station information 402 that is stored in the network configuration storing means 207 in advance (S601), and converts latitude and longitude information to an XY coordinate (Step S602). A method of converting latitude and longitude information of a limited area to an XY coordinate is widely known. Next, traffic demand, location registration demand, and handover demand for each wireless cell is acquired from the wireless cell information 403 (Step S603). Then, the number of clusters to be divided into is set as the number of wireless network control stations (Step S604), and wireless cells having an initial value of a cluster center as the number of clusters are selected randomly (Step S605).

Next, the configuration managing means 204 uses a weighted k-means method (k-average method) to carry out cluster division of all wireless cells (Step S606). Then, the configuration managing means 204 counts the number of handover in a wireless network control station and between wireless network control stations with a configuration after subdivision, and recounts a load for each wireless network control station (Step S607). Here, assuming that ai represents a processing load of a wireless network control station i, and k represents the number of wireless network control stations (Step S608), Fairness Index is calculated (Step S609). Fairness Index is an index showing bias of loads, and is an amount that is normalized to be 1 when loads are completely even, and 0 as there is more bias in loads. In case Fairness Index becomes maximum, a configuration is stored (Step S610). Here, in case Fairness Index becomes sufficiently close to 1, or whether a recurrence rate exceeds a threshold value or not is checked (Step S611), and when Fairness Index becomes sufficiently close to 1 or when the recurrence rate exceeds the threshold value, the processing moves to Step S612, or return to Step S605 in other cases. In Step S612, the wireless base station information 402 and the wireless cell information 403 are updated to change a containing relationship. More specifically, in the wireless base station information 402 and the wireless cell information 403, a wireless network control station ID is changed. Then, the configuration management operation ends (Step S613).

Figure 10:
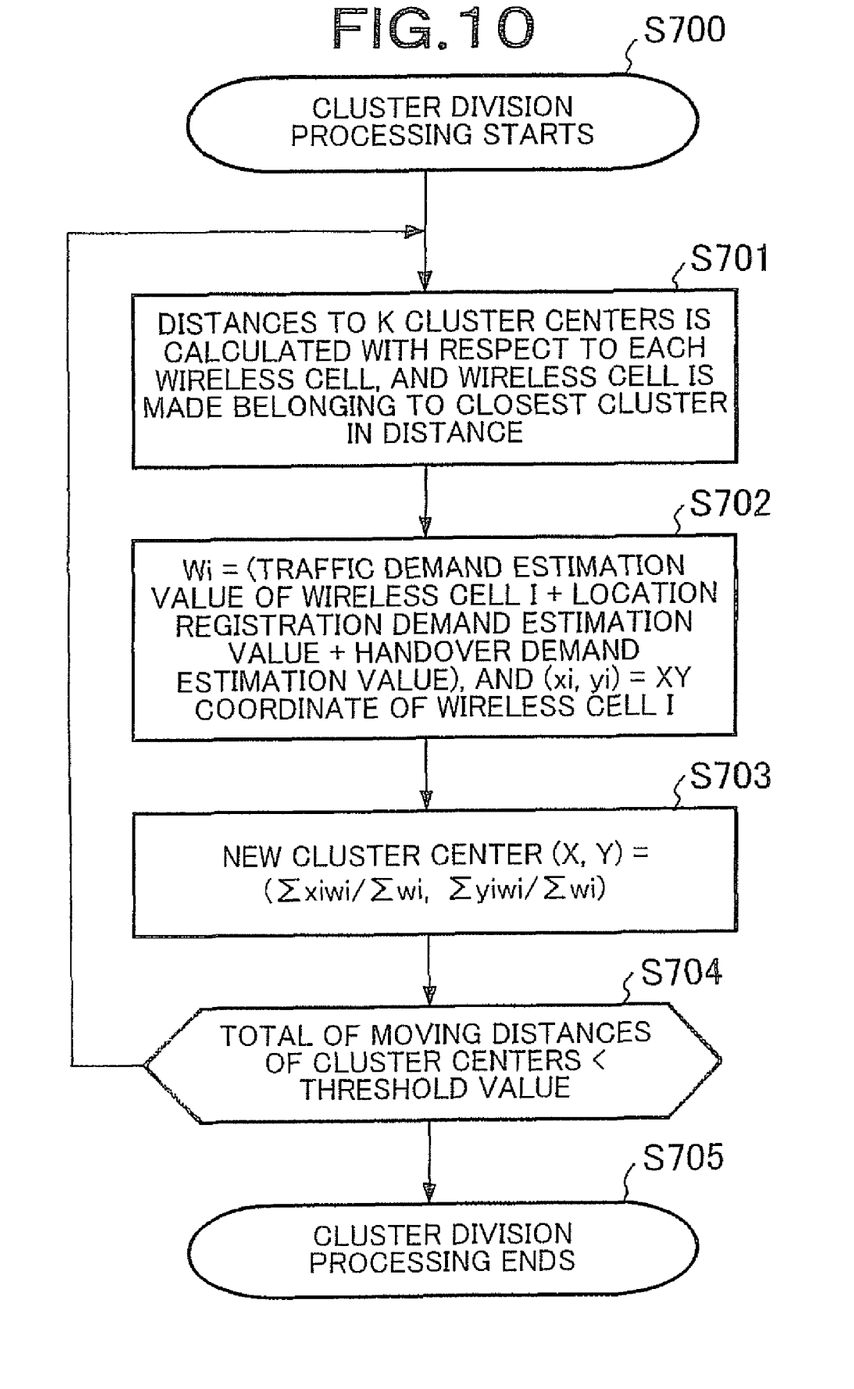
FIG. 10 is a flowchart showing operation of cluster division processing.

FIG. 10 is a flowchart showing operation of cluster division processing of the configuration management operation shown in FIG. 9. In the cluster division processing, the configuration managing means 204 calculates a distance to k cluster centers with respect to each wireless cell first, and the each wireless cell is made belonging to a cluster which is closest in position (Step S701). Next, a weight wi is calculated in a manner as wi=(traffic demand estimation value of a wireless cell i+location registration demand estimation value+handover demand estimation value) for each wireless cell belonging to each cluster. In addition, (xi, yi)=an XY coordinate of the wireless cell i is established (Step S702).

When a weight wi for each wireless cell belonging to each cluster is calculated, a location registration demand estimation value and a handover demand estimation value are used in addition to a traffic demand estimation value. Accordingly, the configuration managing means 204 carries out configuration management in consideration of handover demand and location registration demand along movement to other wireless cells adjacent to the wireless cell, in addition to traffic demand of each wireless cell. In addition, by processing of Step S701, a plurality of wireless cells to be controlled by a wireless network control station are selected in a manner geographically adjacent to each other.

The wi obtained in the above manner is used to obtain a new cluster center (X, Y) from (X, Y)=(ΣXiWi/ΣYiWi/ΣWi) (X,Y) (Step S703). In case a total moving distance of a cluster center becomes sufficiently small (Step S704), the cluster division processing ends (Step S704). In case the cluster center is still moving, the processing returns to Step S701.

The method of cluster division shown here is called the weighted k-average method. However, there are a variety of methods for cluster division being known, and a method of cluster division used in the present invention is not limited to the above in particular.

As described above, the wireless access network management device 90 carries out configuration management in consideration of handover demand and location registration demand accompanied by movement to other wireless cells adjacent to the wireless cell, in addition to traffic demand of each wireless cell. Therefore, processing loads between different wireless network control stations can be leveled efficiently.

The wireless access network management device 90 is preferably configured to retain identification information of a wireless network control station, identification information of a wireless base station contained by each wireless network control station, identification information of a wireless cell to which each wireless base station provides a wireless service, and position information of each wireless cell.

In case a wireless cell group contained in a wireless network control station is determined by selecting a unit of wireless cells belonging to the same wireless base station, position information of where the wireless base station is provided may be used as position information of a wireless cell.

In addition, the wireless access network management device 90 is preferably configured to periodically acquire the number of outgoing and incoming calls with respect to a mobile terminal for each wireless cell from a wireless network control device, the number of times of location registration, and the number of times of handover for each adjacent wireless cells, and estimate traffic demand for each wireless cell, location registration demand, and handover demand based on statistics of the above numerical values covering a certain past period.

Also, the wireless access network management device 90 may be configured to retain processing time required for one outgoing or incoming call with respect to a mobile terminal that is measured in advance, processing time required for one time of location registration of a mobile terminal, and processing time required for one time of handover of a mobile terminal in a test operation state and the like of a wireless network control station.

Further, the wireless access network management device 90 may be configured to estimate a processing load for each wireless cell in a wireless network control device, based on estimated traffic demand for each mobile cell, location registration demand, and handover demand, processing time required for one outgoing or incoming call with respect to a mobile terminal, processing time required for one time of location registration of a mobile terminal, and processing time required for one time of handover of a mobile terminal.

In addition, the wireless access network management device 90 may be configured to select and reselect a wireless cell to be contained in a wireless network control device by using an estimated value of a processing load for each wireless cell so that processing loads among a plurality of wireless network control devices are leveled, and notify identification information of a wireless base station to be contained and identification information of the wireless cell to each of the wireless network control devices.

Further, the wireless access network management device 90 may be configured to select a wireless cell group to be contained in a wireless network control device from a geographically-adjacent area, by using a method of weighted clustering that uses an estimated value of a processing load of each wireless cell as a weight. In case the method of weighted clustering that uses an estimated value of a processing load of each wireless cell as a weight is used, a wireless cell group to be contained in a wireless network control device can be efficiently selected and reselected depending on change and the like of a demand characteristic.

In the wireless access network management device 90 in the above example, the communication quality statistics storing means 205 and the network configuration storing means 207 may be configured in different memory areas in the same storage section (memory) physically, or configured individually by using a plurality of storage sections which are different physically. Also, the failure managing means 202, the quality managing means 203, and the configuration managing means 204 may be achieved in software (program) processing by a computer (central processing unit: CPU) that configures a processing section (processor). In this case, the failure managing means 202, the quality managing means 203, and the configuration managing means 204 may be configured by using the same processing section physically, or by using a plurality of processing sections which are different physically. In addition, the storage section and the processing section described above may be configured in an integral manner. In case a function of each of the above-described means is mainly achieved in software processing by a computer, a program that configures the software and a computer-readable recording medium that records the program are included in the scope of the present invention.

In the wireless access network management device 90 of the above example, the demand estimating means 206 mainly corresponds to an inputting means and an estimating means of the present invention, and the configuration managing means 204 mainly corresponds to a selecting means of the present invention. However, the present invention is not limited thereto, and any means, circuit, unit, and the like may be used as long as a function which is similar to a function of each means of the present invention can be achieved.

So far, the present invention has been described with reference to the examples as described above. However, the present invention is not limited to the above examples. A configuration and details of the present invention may be modified in various ways in a manner that a person skilled in the art can understand and within the scope of the present invention.

INDUSTRIAL APPLICABILITY

The present invention can be applied to a mobile communication network. In particular, the present invention can be suitably applied to a wireless network control station that controls a wireless access network.

The invention claimed is:

1. A configuration management method of a wireless access network in a mobile communication system comprising a wireless access network management device, a plurality of wireless network control stations and a plurality of wireless base stations, the wireless base stations each forming at least one wireless cell, the wireless network control stations each being connected to the wireless access network management device and at least one of the plurality of the wireless base stations, the method comprising:

inputting input information notified from the wireless network control stations into the wireless access network management device, the input information including position information of wireless cells formed by the wireless base stations, traffic demand of each wireless cell, location registration demand of each wireless cell, handover demand with respect to each adjacent wireless cells of each wireless cell, and internal processing time required by each of the wireless network control stations for traffic processing, location registration processing, and handover processing; and selecting, by the wireless access network management device, a plurality of wireless cells to be controlled by each of the wireless network control stations so that processing loads of the plurality of wireless network control stations are leveled, based on the input information, wherein the location registration demand is an average number of times of location registration multiplied by processing time of the location registration, the traffic demand is estimated from an average value of a number of times of outgoing and incoming circuit-switched calls and packet-switched calls carried out during a certain past period in a wireless cell, and the handover demand is estimated from a number of times of handover carried out with respect to each adjacent wireless cells.

2. The configuration management method of the wireless access network according to claim 1, wherein the plurality of wireless cells to be controlled by the wireless network control station are selected in a geographically-adjacent manner, by using a method of weighted clustering with a total of the traffic demand for each wireless cell, the location registration demand, and the handover demand as a weight.

3. A configuration management system of a wireless access network in a mobile communication system comprising a plurality of wireless network control stations and a plurality of wireless base stations, the wireless base stations each forming at least one wireless cell, the wireless network control stations each being connected to the management system and at least one of the plurality of the wireless base stations, the management system comprising:

hardware including a processor;

an input unit implemented at least by the hardware to input information including position information of wireless cells formed by the wireless base stations, traffic demand of each wireless cell, location registration demand of each wireless cell, handover demand with respect to each adjacent wireless cells of each wireless cell, and internal processing time required by each of the wireless network control stations for traffic processing, location registration processing, and handover processing; and a select unit implemented at least by the hardware to select a plurality of wireless cells to be controlled by each of the wireless network control stations so that processing loads of the plurality of wireless network control stations are leveled, based on the input information, wherein the location registration demand is an average number of times of location registration multiplied by processing time of the location registration, the traffic demand is estimated from an average value of a number of times of outgoing and incoming circuit-switched calls and packet-switched calls carried out during a certain past period in a wireless cell, and the handover demand is estimated from a number of times of handover carried out with respect to each adjacent wireless cells.

4. The configuration management system of the wireless access network according to claim 3, further comprising an estimate unit implemented at least by the hardware to:
estimate the traffic demand from an average value of a number of times of outgoing and incoming circuit-switched calls and packet-switched calls carried out during a certain past period in a wireless cell;
estimate the location registration demand from an average value of a number of times of location registration; and
estimate the handover demand from a number of times of handover carried out with respect to each adjacent wireless cells.

5. The configuration management system of the wireless access network according to claim 3, wherein the select unit selects the plurality of wireless cells to be controlled by the wireless network control station in a geographically-adjacent manner, by using a method of weighted clustering with a total of the traffic demand for each wireless cell, the location registration demand, and the handover demand as a weight.

6. A mobile communication system, comprising the configuration management system of a wireless access network according to claim 3.

7. A wireless access network management device that carries out configuration management of a wireless base station in a mobile communication system comprising a plurality of wireless network control stations and a plurality of wireless base stations, the wireless base stations each forming at least one wireless cell, the wireless network control stations each being connected to the management device and at least one of the plurality of the wireless base stations, the management device comprising:

hardware including a processor;

an input unit implemented at least by the hardware to input information including position information of wireless cells formed by the wireless base stations, traffic demand of each wireless cell, location registration demand of each wireless cell, handover demand with respect to each adjacent wireless cells of each wireless cell, and internal processing time required by each of the wireless network control stations for traffic processing, location registration processing, and handover processing; and a select unit implemented at least by the hardware to select a plurality of wireless cells to be controlled by each of the wireless network control stations so that processing loads of the plurality of wireless network control stations are leveled, based on the input information, wherein the location registration demand is an average number of times of location registration multiplied by processing time of the location registration, the traffic demand is estimated from an average value of a number of times of outgoing and incoming circuit-switched calls and packet-switched calls carried out during a certain past period in a wireless cell, and the handover demand is estimated from a number of times of handover carried out with respect to each adjacent wireless cells.

8. A mobile communication system, comprising the wireless access network management device according to claim 7.

* * * * *